United States Patent [19]

Sandstrom

[11] Patent Number: 5,462,979
[45] Date of Patent: Oct. 31, 1995

[54] SULFUR CURED RUBBER COMPOSITION CONTAINING EPOXIDIZED NATURAL RUBBER AND CARBOXYLATED NITRILE RUBBER

[75] Inventor: Paul H. Sandstrom, Tallmadge, Ohio

[73] Assignee: The Goodyear Tire & Rubber Company, Akron, Ohio

[21] Appl. No.: 313,954

[22] Filed: Sep. 28, 1994

[51] Int. Cl.⁶ .............................. C08L 9/00; C08L 13/00; C08L 15/00; C08K 3/36
[52] U.S. Cl. ..................... 523/438; 525/221; 152/209 R
[58] Field of Search .................... 525/221; 523/438; 152/209 R

[56] References Cited

U.S. PATENT DOCUMENTS 5,023,301  6/1991  Burlett ................................. 525/232
5,225,479  7/1993  Senyek ................................. 525/233
5,396,940  3/1995  Segatta ................................. 523/438

*Primary Examiner*—Melvyn I. Marquis
*Assistant Examiner*—D. R. Wilson
*Attorney, Agent, or Firm*—Bruce J. Hendricks

[57] ABSTRACT

The present invention relates to a sulfur cured rubber composition particularly suited for use in tire treads. The sulfur cured rubber composition is composed of, based on 100 parts by weight of rubber, from about 1.0 to 15 parts by weight of epoxidized rubber; from about 1.0 to 15 parts by weight of a carboxylated nitrile rubber; and 98 to 70 parts by weight of a rubber selected from the group consisting of medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber and mixtures thereof.

5 Claims, No Drawings

SULFUR CURED RUBBER COMPOSITION CONTAINING EPOXIDIZED NATURAL RUBBER AND CARBOXYLATED NITRILE RUBBER

BACKGROUND OF THE INVENTION

A pneumatic tire is a polymeric composite and is a complex system of interacting components, each with specific properties for maximum effectiveness. One of the more important components of a tire is the tread. Since the tread of a tire comes into contact with the road, it is particularly compounded for abrasion and tear resistance. For example, abrasion resistance can correlate to tread wear and tear resistance can correlate to the tread's ability to resist chunking or tearing of the ground contacting tread elements. With the ever present need to improve the performance of tires, there is a continuous need for a rubber composition which improves both abrasion resistance and tear values.

SUMMARY OF THE INVENTION

The present invention relates to a sulfur cured rubber composition particularly suited for the tread of a pneumatic tire. The sulfur cured rubber composition is composed of, based on 100 parts by weight of rubber, 1.0 to 15 parts by weight of epoxidized rubber; 1.0 to 15 parts by weight of a carboxylated nitrile rubber; and 98 to 70 parts by weight of a rubber selected from the group consisting of medium vinyl polybutadiene, styrene-butadiene rubber, synthetic cis 1,4-polyisoprene, synthetic 3,4-polyisoprene, natural rubber, cis-polybutadiene, styrene-isoprene rubber, styrene-isoprene-butadiene rubber, acrylonitrile-butadiene rubber and mixtures thereof.

DETAILED DESCRIPTION OF THE INVENTION

In accordance with one embodiment of the present invention, there is disclosed a pneumatic tire having an outer circumferential tread wherein said tread is a sulfur cured composition composed of, based on 100 parts by weight of rubber (phr) (a) 1.0 to 15 parts by weight of a epoxidized natural rubber; (b) 1.0 to 15 parts by weight of a carboxylated nitrile rubber and 98 to 70 parts by weight of a rubber selected from the group consisting of medium vinyl polybutadiene, styrene-butadiene rubber, synthetic cis 1,4-polyisoprene, synthetic 3,4-polyisoprene, natural rubber, cis-polybutadiene, styrene-isoprene rubber, styrene-isoprene-butadiene rubber, acrylonitrile-butadiene rubber and mixtures thereof.

As known to those skilled in the art, epoxidized natural rubber is a modified form of natural rubber in which some of the unsaturation is replaced by epoxidized groups. Epoxidized natural rubber which may be used in the present invention may have a level of epoxidized modification ranging from about 15 to 85 mole percent. Preferably, the epoxidized level will be in the range of from about 20 to 50 percent. A particularly preferred epoxidized level is 25 percent. As known to those skilled in the art, epoxidized natural rubber can be obtained by epoxidizing natural rubber latex. This material is commercially available from Malaysian rubber producers under the designation ENR 50 (50 percent epoxidized level) and ENR 25 (25 percent epoxidized level) in the form of dehydrated bales.

Based on 100 parts by weight of the total rubber in the sulfur-cured rubber composition, from 1.0 to 15 phr, is the epoxidized rubber. Preferably, from 2.5 to 10 parts by weight is the epoxidized rubber.

The second component contained in the present invention is a carboxylated nitrile rubber. Based on 100 parts by weight of the total rubber in the sulfur-cured rubber composition, from 1.0 to 15 parts by weight, is the carboxylated nitrile rubber. Preferably, from 2.5 to 10 parts by weight is the carboxylated nitrile rubber.

The carboxylated nitrile rubbers (elastomers) contain chain linkages derived from unsaturated carboxylic acids of the acrylic acid type (unsaturated carboxylic acid monomers). Some representative examples of unsaturated carboxylic acids of the acrylic acid type include acrylic acid, methacrylic acid, sorbic acid, β-acryloxypropanoic acid, ethacrylic acid, 2-ethyl-3-propyl acrylic acid, vinyl acrylic acid, cinnamic acid, maleic acid, fumaric acid and the like. Carboxylated nitrile rubbers generally contain from about 0.75 percent to 15 percent by weight chain linkages (repeat units) which are derived from unsaturated carboxylic acid monomers.

The carboxylic nitrile rubbers can be synthesized using any conventional polymerization technique. Emulsion polymerization of carboxylated nitrile elastomers is generally preferred and is used almost exclusively in industrial production. This type of a synthesis generally utilizes a charge composition comprising water, monomers, an initiator and an emulsifier (soap). Such polymerizations can be run over a very wide temperature range from about 0° C. to as high as 100° C. It is more preferred for these polymerizations to be run at a temperature from about 5° C. to 60° C.

The amount of carboxylic acid monomer (unsaturated carboxylic acid of the acrylic acid type) incorporated in a carboxylated nitrite rubber may be varied over a wide range. The monomer charge ratio between the carboxylic monomer and the comonomers employed in a polymerization may also be varied over a very wide range. Generally, the charge composition used in the synthesis of carboxylated nitrile rubbers will contain 60 percent to 75 percent by weight butadiene, 15 percent to 35 percent by weight of acrylonitrile and 1 percent to 15 percent by weight methacrylic acid, based upon the total monomer charge. A typical charge composition for a carboxylated nitrile rubber will contain 65 to 69 weight butadiene, 24 to 28 weight percent acrylonitrile and 5 to 9 weight percent methacrylic acid.

The emulsifiers used in the polymerization of such polymers may be charged at the outset of the polymerization or may be added incrementally or by proportioning as the reaction proceeds. Generally, anionic emulsifier systems provide good results; however, any of the general types of anionic, cationic or nonionic emulsifiers may be employed in the polymerization.

Among the anionic emulsifiers that can be employed in emulsion polymerizations are fatty acids and their alkali metal soaps such as caprylic acid, capric acid, pelargonic acid, lauric acid, undecylic acid, myristic acid, palmitic acid, margaric acid, stearic acid, arachidic acid and the like; amine soaps of fatty acids such as those formed from ammonia, mono- and dialkyl amines, substituted hydrazines, guanidine and various low molecular weight diamines; chain-substituted derivatives of fatty acids such as those having alkyl substituents; naphthenic acids and their soaps and the like; sulfuric esters and their salts, such as the tallow alcohol sulfates, coconut alcohol sulfates, fatty alcohol sulfates, such as oleyl sulfate, sodium lauryl sulfate and the like; sterol sulfates; sulfates of alkylcyclohexanols, sulfation products of lower polymers of ethylene as $C_{10}$ to $C_{20}$ straight chain olefins, and other hydrocarbon mixtures, sulfuric esters of aliphatic and aromatic alcohols having intermediate linkages, such as ether, ester or amide groups such as alkylbenzyl (polyethyleneoxy) alcohols, the sodium salt or tridecyl ether sulfate; alkane sulfonates, esters and salts, such as alkylchlorosulfonates with the general formula $RSO_2Cl$, wherein R is an alkyl group having from 1 to 20 carbon atoms, and alkylsulfonates with the general formula $RSO_2$—OH, wherein R is an alkyl group having from 1 to 20 carbon atoms; sulfonates with intermediate linkages such as ester and ester-linked sulfonates such as those having the formula $RCOOC_2H_4SO_3H$ and $ROOC$—$CH_2$—$SO_3H$, wherein R is an alkyl group having from 1 to 20 carbon atoms such as dialkyl sulfosuccinates; ester salts with the general formula:

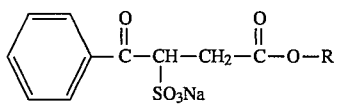

wherein R is an alkyl group having from 1 to 20 carbon atoms; alkaryl sulfonates in which the alkyl groups contain preferably from 10 to 20 carbon atoms, e.g. dodecylbenzenesulfonates, such as sodium dodecylbenzenesulfonate; alkyl phenol sulfonates; sulfonic acids and their salts such as acids with the formula $RSO_3Na$, wherein R is an alkyl and the like; sulfonamides, sulfamido methylenesulfonic acids; rosin acids and their soaps; sulfonated derivatives of rosin and rosin oil; and lignin sulfonates and the like.

Rosin acid soap has been used with good success at a concentration of about 5 percent by weight in the initial charge composition used in the synthesis of carboxylated elastomers. Of rosin acids, about 90 percent are isomeric with abietic acid and the other 10 percent is a mixture of dehydro abietic acid and dihydro abietic acid.

The polymerization of these carboxylated nitrile rubbers may be initiated using free radical catalysts, ultraviolet light or radiation. To ensure a satisfactory polymerization rate, uniformity and a controllable polymerization, free radical initiators are generally used with good results. Free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauroyl peroxide, cumene hydroperoxide, p-menthane hydroperoxide, t-butylhydroperoxide, acetyl acetone peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide and the like; the various azo compounds such as 2-t-butylazo-2-cyanopropane, dimethyl azodiisobutyrate, azodiisobutyronitrile, 2-t-butylazo-1-cyanocyclohexane, 1-t-amylazo-1-cyanocyclohexane and the like; the various alkyl perketals, such as 2,2-bis-(t-butylperoxy)butane, ethyl 3,3-bis(t-butylperoxy)butyrate, 1,1-di-(t-butylperoxy)cyclohexane and the like. Cumene hydroperoxide can be used as an initiator to obtain very good results in the polymerization of carboxylated nitrile rubber.

The emulsion polymerization system used in the synthesis of carboxylated nitrile rubbers can be treated at the desired degree of conversion with shortstopping agents, such as hydroquinone. Typical shortstopping agents will not interfere with the action of the succinic acid derivative salts as scorch inhibitors. Typical stabilizing agents and standard antioxidants can also be added to the emulsion of a carboxylated nitrile rubber.

After the emulsion polymerization has been completed, most conventional coagulating techniques for carboxylated nitrile rubbers can be employed. A review of coagulation techniques for nitrile rubbers is presented in Hofmann, Werner "Nitrile Rubber," *Rubber Chemistry and Technology*, vol. 37, no. 2, part 2 (April-June 1964), pp. 94–96, which is incorporated herein by reference. Normally such latexes are coagulated with reagents which ensure the preservation of the carboxyl groups of the elastomers as acidic moieties. Coagulation with acid or blends of salts with acids is usually very satisfactory. For example, sulfuric acid, hydrochloric acid, blends of sodium chloride with sulfuric acid and blends of hydrochloric acids with methanol are very effective as coagulating agents for carboxylated rubber emulsions. Calcium chloride solutions which are free of calcium hydroxide have also been used as coagulants with great success.

After coagulation, washing may be employed to remove excess soap and/or electrolyte from the carboxylated rubber. Sometimes washing is also useful in adjusting the pH of the carboxylated elastomer that has been synthesized. After washing, if it is desired, the elastomer can be dewatered. If it is desirable to do so, the carboyxlated rubber can also be dried and baled after dewatering using conventional techniques.

Example of commercially available carboxylated nitrile rubber are HYCAR® 1072 (Bd/ACN=65/34, with 1 percent carboxylic acid) marketed by BF Goodrich and CHEMIGUM® NX-775 (Bd/ACN-55/38 with 7 percent carboxylic acid) marketed by The Goodyear Tire & Rubber Company. These carboxylated copolymers contain approximately 0.5–10 percent by weight terminal carboxyl groups.

The sulfur cured rubber composition also contains a natural or synthetic diene derived rubber. Representative of the rubbers include medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber and mixtures thereof. Preferably, the rubber is natural rubber, styrene-butadiene rubber or cis-polybutadiene. This rubber, other than the epoxidized natural rubber and carboxylated nitrile rubber, may be used in amounts ranging from 98 to 70 parts by weight based on 100 parts by weight of total rubber. Preferably, this rubber is used in amounts ranging from about 95 to about 80 parts by weight based on 100 parts by weight of total rubber.

The compositions of the present invention may be compounded by conventional means including a Banbury®, mill, extruder, etc. It has been found to be preferred to add the carboxylated nitrile rubber at a separate stage than the epoxidized rubber.

In addition to the above-identified and required components of the sulfur cured rubber compositions of the present invention, one may also use a siliceous pigment (alternatively referred to herein as silica filler). The silica filler that can be used include both pyrogenic and precipitated finely-divided silicas of the type heretofore employed for rubber compounding. The silica filler, however, is preferably of the type obtained by precipitation from a soluble silicate, such as sodium silicate. For example, silica fillers produced according to the method described in U.S. Pat. No. 2,940,830 can be used. These precipitated, hydrated silica pigments have a $SiO_2$ content of at least 50% and usually greater than 80% by weight on anhydrous basis. The silica filler may have an ultimate particle size in the range of from about 50 to 10,000 angstroms, preferably between 50 and 400 and, more preferably, between 100 and 300 angstroms.

The silica may be expected to have an average ultimate particle size in a range of about 0.01 to 0.05 microns as determined by electron microscope, although the silica particles may even be smaller in size. The BET surface area of the filler as measured using nitrogen gas is preferably in the range of 40 to 600 square meters per gram, usually 50 to 300 square meters per gram. The BET method of measuring surface area is described in the *Journal of the American Chemical Society*, Vol. 60, page 304 (1930). The silica also has a dibutyl (DBP) absorption value in a range of about 200 to about 400, with a range of from about 220 to 300 being preferred.

Various commercially available silicas may be considered, for example, silicas commercially available from PPG Industries under the Hi-Sil trademark such as, for example, those with designations 210, 243, etc.; silicas available from Rhone-Poulenc, with designations of Z1165MP and Z165GR and silicas available from Degussa AG with designations VN2 and VN3, etc. The Rhone-Poulenc Z1165MP silica is a preferred silica which is reportedly characterized by having a BET surface area of about 160–170 and by a DBP value of about 250–290 and by having a substantially spherical shape.

The amount of silica filler used as the reinforcing filler can vary widely. Generally speaking, the amount may range between about 5 and about 85 parts by weight of siliceous pigment per 100 parts by weight of total rubber are used. More typically, between about 10 and 50 parts by weight of siliceous pigment per 100 parts of rubber are used.

In compounding a silica filled rubber composition, one generally uses a coupling agent. Such coupling agents, for example, may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are generally composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

The silane of the coupling agent apparently forms a bond to the silica surface, possibly through hydrolysis, and the rubber reactive component of the coupling agent combines with the rubber itself. Usually the rubber reactive component of the coupler is temperature sensitive and tends to combine with the rubber during the final and higher temperature sulfur vulcanization stage and, thus, subsequent to the rubber/silica/coupler mixing stage and, therefore, after the silane group of the coupler has combined with the silica. However, partly because of typical temperature sensitivity of the coupler, some degree of combination, or bonding, may occur between the rubber-reactive component of the coupler and the rubber during an initial rubber/silica/coupler mixing stages and, thus, prior to a subsequent vulcanization stage.

The rubber-reactive group component of the coupler may be, for example, one or more of groups such as mercapto, amino, vinyl, epoxy, and sulfur groups, preferably a sulfur or mercapto moiety and more preferably sulfur.

A representative coupling agent may be, for example, a bifunctional sulfur containing organosilane such as, for example, bis-(3-triethoxysilylpropyl)tetrasulfide, bis-(3-trimethoxysilylpropyl)tetrasulfide and bis(3-triethoxysilylpropyl)tetrasulfide grafted silica from DeGussa, A. G. The amount of silica coupling agent which may be used may range from about 0.5 to about 8.5 parts by weight per 100 parts by weight of total rubber used. Preferably, the amount of silica coupler ranges from about 1.0 to about 5.0 parts by weight per 100 parts by weight of rubber used.

The sulfur cured rubber composition may also contain conventional additives including reinforcing agents, fillers, peptizing agents, pigments, stearic acid, accelerators, sulfur vulcanizing agents, antiozonants, antioxidants, processing oils, activators, initiators, plasticizers, waxes, prevulcanization inhibitors, extender oils and the like. Representative of reinforcing agents include carbon black, which is typically added in amounts ranging from about 5 to 100 parts by weight based on 100 parts by weight of total rubber (phr). Preferably, carbon black is used in amounts ranging from about 15 to 85 phr. Typical carbon blacks that are used include N110, N121, N220, N231, N234, N242, N293, N299, N326, N330, M332, N339, N343, N347, N351, N358, N375, N472, N539, N550, N660, N683, N754, and N765. Depending on the particular use of the compound, the appropriate carbon black may be selected. Representative of conventional accelerators are amines, guanidines, thioureas, thiols, thiurams, sulfenamides, dithiocarbamates and xanthates which are typically added in amounts of from about 0.2 to about 5 phr. Representative of sulfur vulcanizing agents include element sulfur (free sulfur) or sulfur donating vulcanizing agents, for example, an amine disulfide, polymeric polysulfide or sulfur olefin adducts. The amount of sulfur vulcanizing agent will vary depending on the type of rubber and particular type of sulfur vulcanizing agent but generally range from about 0.1 phr to about 5 phr with a range of from about 0.5 phr to about 2 phr being preferred. Representative of the antidegradants which may be in the rubber composition include monophenols, bisphenols, thiobisphenols, polyphenols, hydroquinone derivatives, phosphites, phosphate blends, thioesters, naphthylamines, diphenol amines as well as other diaryl amine derivatives, paraphenylene diamines, quinolines and blended amines. Antidegradants are generally used in an amount ranging from about 0.1 phr to about 10 phr with a range of from about 2 to 6 phr being preferred. Representative of a peptizing agent that may be used is pentachlorophenol which may be used in an amount ranging from about 0.1 phr to 0.4 phr with a range of about 0.2 to 0.3 phr being preferred. Representative of processing oils which may be used in the rubber composition of the present invention include aliphatic-naphthenic aromatic resins, polyethylene glycol, petroleum oils, ester plasticizers, vulcanized vegetable oils, pine tar, phenolic resins, petroleum resins, polymeric esters and rosins. These processing oils may be used in a conventional amount ranging from about 0 to about 50 phr with a range of from about 5 to 35 phr being preferred. Representative of an initiator that may be used is stearic acid. Initiators are generally used in a conventional amount ranging from about 1 to 4 phr with a range of from about 2 to 3 phr being preferred.

Accelerators may be used in a conventional amount. In cases where only a primary accelerator is used, the amounts range from about 0.5 to 2.5 phr. In cases where combinations of two or more accelerators are used, the primary accelerator is generally used in amounts ranging from 0.5 to 2.0 phr and a secondary accelerator is used in amounts ranging from about 0.1 to 0.5 phr. Combinations of accelerators have been known to produce a synergistic effect. Suitable types of conventional accelerators are amines, disulfides, guanidines, thioureas, thiazoles, thiurams, sulfenamides, dithiocarbamates and xanthates. Preferably, the primary accelerator is a sulfenamide. If a secondary accelerator is used, it is preferably a guanidine, dithiocarbamate or thiuram compound.

Pneumatic tires are conventionally comprised of a generally toroidal shaped carcass with an outer circumferential tread adapted to the ground contacting space beads and sidewalls extending radially from and connecting said tread to said beads. The tread may be built, shaped, molded and cured by various methods which will be readily apparent to those skilled in the art.

The sulfur cured rubber composition may be used to form a tread rubber which can then be applied in the building of a green tire in which the uncured, shaped tread is built unto the carcass following which the green tire is shaped and cured. Alternatively, the tread can be applied to a cured tire carcass from which the previously tread has been buffed or abraded away and the tread cured thereon as a retread.

The practice of this invention is further illustrated by reference to the following examples which are intended to be representative rather than restrictive of the scope of the invention. Unless otherwise indicated, all parts and percentages are by weight.

EXAMPLE 1

Rubber compositions containing the materials set out in Table I were prepared in a BR Banbury® using three separate stages of addition. Table I also sets out the cure behavior and vulcanizate properties for the control compound A and also compounds B, C and control D which contain polyisoprene, epoxidized natural rubber and carboxylated nitrile rubber.

TABLE I

| Sample | Control A | B | C | Control D |
|---|---|---|---|---|
| 1st Non-Productive | | | | |
| Polyisoprene[1] | 100 | 90 | 80 | 60 |
| Epoxidized NR[2] | 0 | 5 | 10 | 20 |
| Carbon Black | 35 | 35 | 35 | 35 |
| Zinc Oxide | 5 | 5 | 5 | 5 |
| Processing Oil | 5 | 5 | 5 | 5 |
| Fatty Acid | 2 | 2 | 2 | 2 |
| Antioxidant | 2 | 2 | 2 | 2 |
| 2nd Non-Productive | | | | |
| Carbon Black | 15 | 15 | 15 | 15 |
| Carboxylated Nitrile[3] | 0 | 5 | 10 | 20 |
| Productive | | | | |
| Sulfur | 1.4 | 1.4 | 1.4 | 1.4 |
| Accelerator | 1.0 | 1.0 | 1.0 | 1.0 |
| Rheometer, 150° C. | | | | |
| Max Torque | 40.0 | 40.3 | 38.0 | 37.0 |
| Min Torque | 6.7 | 8.0 | 8.4 | 12.0 |
| Δ Torque | 33.3 | 32.3 | 29.6 | 25.0 |
| T90 (min) | 13.3 | 13.0 | 14.5 | 14.0 |
| Stress-Strain | | | | |
| Tensile Strength (MPa) | 21.1 | 19.6 | 14.7 | 8.4 |
| Elongation @ Brk (%) | 528 | 523 | 428 | 229 |
| M100 (MPa) | 2.0 | 2.6 | 3.1 | 4.5 |
| M300 (MPa) | 11.0 | 10.6 | 10.6 | — |
| Hardness | | | | |
| Room Temperature | 61 | 68 | 69 | 74 |
| 100° C. | 56 | 58 | 57 | 58 |
| Rebound | | | | |
| Room Temperature | 48 | 35 | 30 | 23 |
| 100° C. | 63 | 53 | 50 | 47 |
| Strebler to Self (N) | 111 | 169 | 73 | 6 |
| DIN Abrasion (% Standard) | 108 | 62 | 87 | 142 |

[1]Natsyn® 2200 obtained from The Goodyear Tire & Rubber Company
[2]ENR-25 obtained from The Malaysian Rubber Producer's Research Association
[3]Chemigum® NX775 obtained from The Goodyear Tire & Rubber Company As can be seen from the above data, use of 5 and 10 parts of carboxylated nitrile rubber and epoxidized nitrile rubber results in improved (lower) DIN abrasion in comparison to the controls.

At the 5 phr level of carboxylated nitrile rubber and epoxidized nitrile rubber, one gets superior (higher) tear properties (Peel Adhesion) versus the controls.

EXAMPLE 2

Silica-filled rubber compositions containing the materials set out in Table I were prepared in a BR Banbury® using three separate stages of addition. Table II also sets out the cure behavior and vulcanizate properties for control compound E, control compound F and compounds G and H.

TABLE II

| Sample | Control E | Control F | G | H |
|---|---|---|---|---|
| 1st Non-Productive | | | | |
| Polyisoprene[1] | 100 | 100 | 80 | 80 |
| Epoxidized NR[2] | 0 | 0 | 10 | 10 |
| Carbon Black | 35 | 35 | 35 | 35 |
| Zinc Oxide | 5 | 5 | 5 | 5 |
| Processing Oil | 5 | 5 | 5 | 5 |
| Fatty Acid | 2 | 2 | 2 | 2 |
| Antioxidant | 2 | 2 | 2 | 2 |
| 2nd Non-Productive | | | | |
| Silicas | 15 | 15 | 15 | 15 |
| Carboxylated Nitrile[4] | 0 | 0 | 10 | 10 |
| Organosilane Coupling Agent[5] | 0 | 3 | 0 | 3 |
| Productive | | | | |
| Sulfur | 1.4 | 1.4 | 1.4 | 1.4 |
| Sulfenamide Accelerator | 1.0 | 1.0 | 1.0 | 1.0 |
| Rheometer, 150° C. | | | | |
| Max Torque | 26.4 | 31.5 | 27.7 | 30.7 |
| Min Torque | 6.7 | 7.7 | 12.3 | 11.0 |
| Δ Torque | 19.7 | 23.8 | 15.4 | 19.7 |
| T90 (min) | 22.3 | 18.5 | 22.0 | 20.0 |
| Stress-Strain | | | | |
| Tensile Strength (MPa) | 14.1 | 18.2 | 5.7 | 7.5 |
| Elongation @ Brk (%) | 528 | 229 | 414 | 382 |
| M100 (MPa) | 0.96 | 1.53 | 2.05 | 2.60 |
| M300 (MPa) | 3.98 | 7.14 | 4.46 | 6.66 |
| Hardness | | | | |
| Room Temperature | 46.6 | 54.3 | 66.0 | 68.7 |
| 100° C. | 42.2 | 50.6 | 53.1 | 57.1 |
| Rebound | | | | |
| Room Temperature | 42.1 | 45.1 | 27.6 | 27.8 |
| 100° C. | 51.0 | 56.2 | 44.1 | 43.5 |
| DIN Abrasion | 290 | 181 | 175 | 151 |

TABLE II-continued

| Sample | Control E | Control F | G | H |
|---|---|---|---|---|
| (% of Standard) | | | | |

[1]Natsyn ® 2200 obtained from The Goodyear Tire & Rubber Company
[2]ENR-25 obtained from The Malaysian Rubber Producer's Research Association
[3]Hil Sil ® 210 obtained from PPG
[4]Chemigum ® NX775 obtained from The Goodyear Tire & Rubber Company
[5]Si69 obtained from Degussa As can be seen from the above data, Samples G and H have improved modulus and DIN abrasion values versus the corresponding Control E and Control F.

EXAMPLE 3

Silica-filled rubber compositions containing the materials set out in Table III were prepared in a BR Banbury® using three separate stages of addition. Table III also sets out the cure behavior and vulcanizate properties for control compound I, compound J, control compound K and compound L.

TABLE III

| Sample | Control I | J | Control K | L |
|---|---|---|---|---|
| 1st Non-Productive | | | | |
| E-SBR[1] | 68.75 | 68.75 | 68.75 | 68.75 |
| Polybutadiene[2] | 15.00 | 15.00 | 15.00 | 15.00 |
| Polyisoprene[3] | 35.00 | 30.00 | 35.00 | 15.00 |
| Epoxidized NR[4] | 0.00 | 2.5 | 0.00 | 10.00 |
| Silica[5] | 40.00 | 40.00 | 40.00 | 40.00 |
| Carbon Black | 10.00 | 10.00 | 10.00 | 110.00 |
| Zinc Oxide | 3.00 | 3.00 | 3.00 | 3.00 |
| Fatty Acid | 3.00 | 3.00 | 3.00 | 3.00 |
| Organosilane Coupling Agent[6] | 0.00 | 0.00 | 2.00 | 2.00 |
| Antioxidant | 2.00 | 2.00 | 2.00 | 2.00 |
| 2nd Non-Productive | | | | |
| Silica[5] | 30.00 | 30.00 | 30.00 | 30.00 |
| Carboxylated Nitrile[7] | 0.00 | 2.50 | 0.00 | 10.00 |
| Organosilane Coupling Agent[6] | 0.00 | 0.00 | 1.50 | 1.50 |
| Productive | | | | |
| Sulfur | 3.50 | 3.50 | 1.40 | 1.40 |
| Accelerator | 3.50 | 3.50 | 1.80 | 1.80 |
| Secondary Accelerator | 2.00 | 2.00 | 1.50 | 1.50 |
| Rheometer, 150° C. | | | | |
| Max Torque | 58.5 | 59.0 | 46.0 | 52.7 |
| Min Torque | 15.8 | 17.3 | 9.0 | 19.5 |
| Δ Torque | 42.7 | 41.7 | 37.0 | 33.2 |
| T90 (min) | 16.3 | 14.8 | 18.5 | 19.0 |
| Stress-Strain | | | | |
| Tensile Strength (MPa) | 7.75 | 9.89 | 15.4 | 15.2 |
| Elongation @ Brk (%) | 261 | 257 | 384 | 382 |
| M100 (MPa) | 2.77 | 3.57 | 3.48 | 4.81 |
| DIN Abrasion (% of Standard) | 170 | 137 | 112 | 103 |

[1]Plioflex ® 1712 obtained from The Goodyear Tire & Rubber Company
[2]Budene ® 1207 obtained from The Goodyear Tire & Rubber Company
[3]Natsyn ® 2200 obtained from The Goodyear Tire & Rubber Company
[4]ENR-25 obtained from The Malaysian Rubber Producer's Research Association
[5]Z1165 MP obtained from Rhene-Poulenc
[6]Si69 obtained from Degussa TABLE III-continued

| Sample | Control I | J | Control K | L |
|---|---|---|---|---|

[7]Chemigum ® NX775 obtained from The Goodyear Tire & Rubber Company

As can be seen from the above data, the present invention provides improved DIN abrasion values for silica containing compounds both with and without the presence of a silica coupler.

EXAMPLE 4

Rubber compositions containing the materials set out in Table IV were prepared in a BR Banbury® using three separate stages of addition. Table IV also sets out the cure behavior and vulcanizate properties for control compound M, control compound N, control compound O and compound P.

TABLE IV

| Sample | Control M | Control N | Control O | P |
|---|---|---|---|---|
| 1st Non-Productive | | | | |
| Polyisoprene[1] | 100 | 95 | 95 | 90 |
| Epoxidized NR[2] | 0 | 5 | 0 | 5 |
| Carbon Black | 50 | 50 | 50 | 50 |
| Zinc Oxide | 5 | 5 | 5 | 5 |
| Processing Oil | 5 | 5 | 5 | 5 |
| Fatty Acid | 2 | 2 | 2 | 2 |
| Antioxidant | 2 | 2 | 2 | 2 |
| 2nd Non-Productive | | | | |
| Carboxylated Nitrile[3] | 0 | 0 | 5 | 5 |
| Productive | | | | |
| Sulfur | 1.4 | 1.4 | 1.4 | 1.4 |
| Accelerator | 1.0 | 1.0 | 1.0 | 1.0 |
| Rheometer, 1500° C. | | | | |
| Max Torque | 40.0 | 39.3 | 39.0 | 39.0 |
| Min Torque | 9.7 | 9.9 | 10.3 | 11.3 |
| Δ Torque | 30.3 | 29.4 | 28.7 | 27.7 |
| T90 (min) | 13.3 | 13.5 | 13.5 | 13.5 |
| Stress-Strain | | | | |
| Tensile Strength (MPa) | 21.1 | 20.8 | 19.1 | 18.5 |
| Elongation @ Brk (%) | 506 | 518 | 495 | 485 |
| M100 (MPa) | 2.36 | 2.46 | 2.79 | 3.03 |
| Peel Adhesion to Self (N) | 106 | 118 | 152 | 157 |
| DIN Abrasion (% of Standard) | 108 | 101 | 93 | 76 |

[1]Natsyn ® 2200 obtained from The Goodyear Tire & Rubber Company
[2]ENR-25 obtained from The Malaysian Rubber Producer's Research Association
[3]Chemigum ® NX775 obtained from The Goodyear Tire & Rubber Company As can be seen from the data in Table IV, there is a synergistic effect from the presence of both epoxidized rubber and carboxylated nitrile versus the presence of each component alone.

What is claimed is:

1. A pneumatic tire having an outer circumferential tread wherein said tread comprises a sulfur cured rubber composition composed of, based on 100 parts by weight of rubber (phr);

(a) 1.0 to 15 parts by weight of epoxidized natural rubber, wherein the level of epoxidized modification is in the range of from about 15 to 85 mole percent;

(b) 1.0 to 15 parts by weight of a carboxylic acid group containing nitrile rubber;

(c) 98 to 70 parts by weight of a rubber selected from the group consisting of medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber and mixtures thereof.

2. The pneumatic tire of claim 1 wherein the epoxidized rubber has a level of epoxidized modification in the range of from about 20 to 50 mole percent.

3. The pneumatic tire of claim 1 wherein from 0.75 percent to 15 percent by weight of the repeating units in said nitrile rubber are derived from an unsaturated carboxylic acid monomer.

4. The pneumatic tire of claim 1 wherein said composition additionally comprises 5 to 85 parts by weight of a silica filler.

5. The pneumatic tire of claim 4 wherein the silica is selected from the group consisting of pyrogenic and precipitated silicas.

* * * * *